2 Sheets—Sheet 1.

E. JONES.

Harvester.

No. 1,743. Reissued Aug. 23, 1864.

Witnesses:

W. York Allen

John P. Jacobs

Inventor:

Edwin Jones

By his Attorney

Thos. H. Dodge

N. PETERS. Photo-Lithographer. Washington, D. C.

2 Sheets—Sheet 2.

E. JONES.

Harvester.

No. 1,743. Reissued Aug. 23, 1864.

Witnesses:

N. York & Co

John E. Jacobs

Inventor:

Edwin Jones

By his Attorney

Thos. H. Dodge

N. PETERS, Photo-Lithographer, Washington, D. C.

UNITED STATES PATENT OFFICE.

EDWIN JONES, OF CHESTER CROSS ROADS, OHIO.

IMPROVEMENT IN HARVESTERS.

Specification forming part of Letters Patent No. 27,636, dated March 27, 1860; Reissue No. 1,743, dated August 23, 1864.

DIVISION NO. 1.

*To all whom it may concern:*

Be it known that I, EDWIN JONES, of Chester Cross Roads, in the county of Geauga and State of Ohio, have invented certain new and useful Improvements in Combined Reapers and Mowers, of which the following is a full, clear, and exact description, reference being had to the accompanying drawings, which form a part of this specification, and in which—

Figure 1:
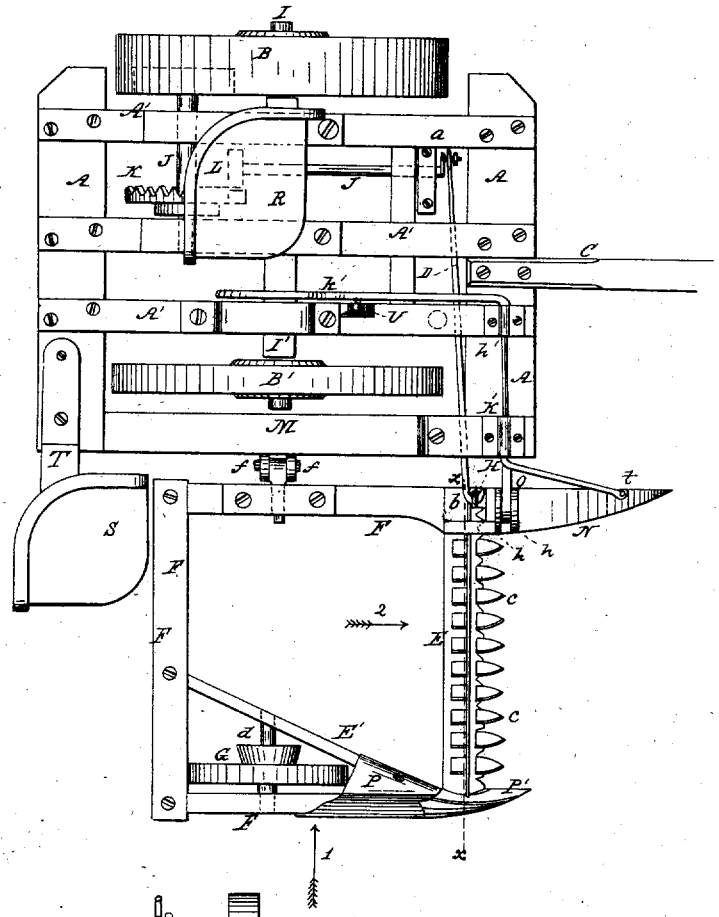
Figure 2:
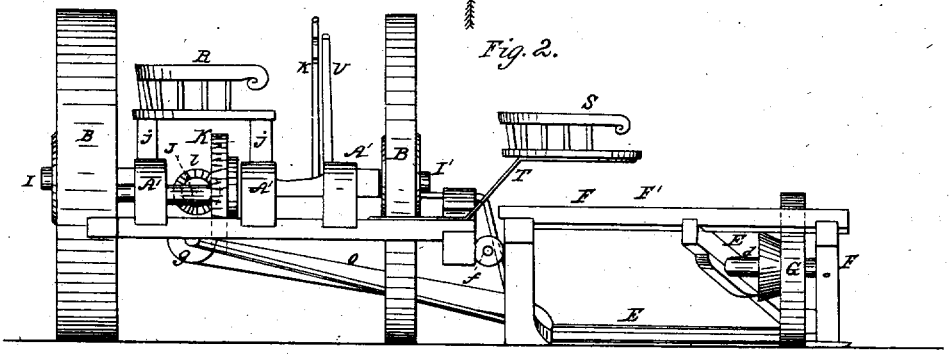
Figure 3:
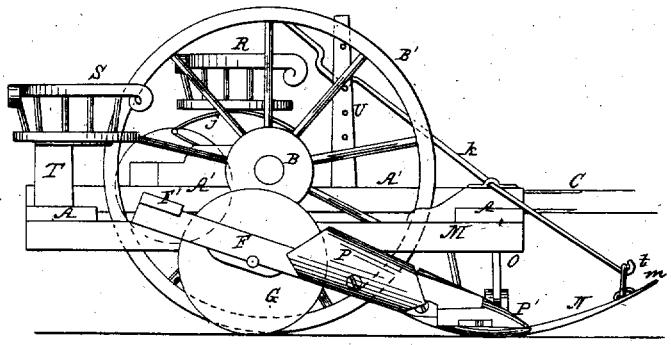
Figure 4:
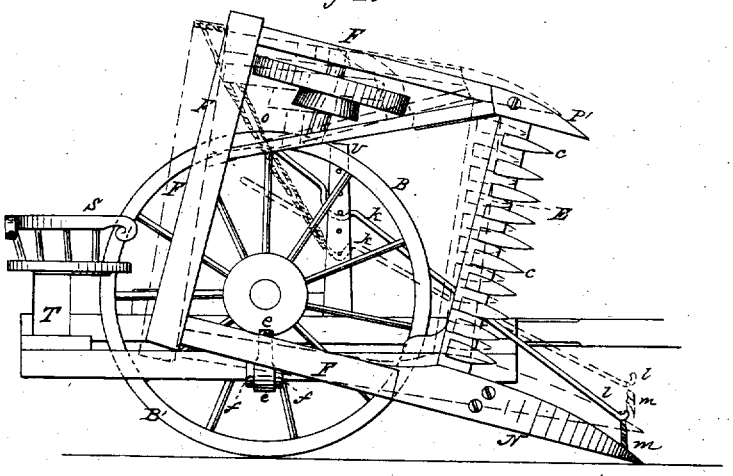
Figure 5:
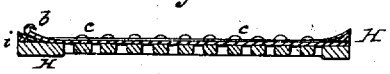

Figure 1 represents a plan or top view of the machine with the grain-platform removed for mowing. Fig. 2 represents a rear view of the same. Fig. 3 represents a side view, looking in the direction of arrow 1, Fig. 1. Fig. 4 represents a similar view with the finger-beam raised or folded up for transportation or storage, the finger-beam being shown in two different positions—one in black and the other in red lines—to illustrate the mode of folding the finger-beam for transportation by aid of a lifting-lever and chain or cord. Fig. 5 represents a section of the finger and cutter bars on line *x x*, Fig. 1, looking in the direction of arrow 2, Fig. 1, only so much of the parts being shown as is necessary to illustrate the cutter-bar in combination with the machine at the heel of the finger bar or beam.

In the drawings, A A represent the front and rear cross-pieces of the main frame, which are fastened securely to three longitudinal pieces, A′ A′ A′, the pieces A A projecting at each end beyond the outer pieces, A′, for the purpose of affording a protection to the wheels B B′, which support the main frame, composed, as above stated, of pieces A A and A′ A′ A′. Wheels B B′ are arranged to turn loosely on stationary journals I I′, sustained and supported by the longitudinal pieces A′, the ends of the journals projecting sufficiently far on each side of the frame to permit of the wheels being placed on the outside of the two outer pieces, A′ A′, one on each side. By this arrangement the outer end of the journal of each wheel is disconnected, so that there is no danger of cut stalks of grass or grain being wound about the journal; but if it should at any time happen it can be easily removed, and without trouble, since the ends of the journal can be readily reached by an attendant and the substance pulled off of the end of the journal—something which could not be done were the outer ends of the journals supported in boxes or bearings. The projecting ends of the cross-pieces A A are quite important as a means of protecting the wheels when passing through gates, by stone-heaps, stumps, and like obstructions. This is especially true of the outer wheel, B, which is generally the most exposed in passing through gates, as the machine is generally run quite close to the gate on that side in order to give as much room as possible for the heel end of the finger-beam and its shoe. By the use of three longitudinal pieces A′ the journal end of each wheel can be supported out close to its respective wheel, while the middle piece A′ answers, in combination with the piece next to wheel B, as a convenient and ready means of supporting shafts and gearing which operate the cutter. Wheel B is provided with an inner projecting rim, the under side of which is provided with cog-teeth, and is consequently called the "driving-wheel." Shaft J is supported in suitable bearings, so as to turn on a line parallel to the axis of motion of wheel B, while its outer end extends beyond the frame and under the rim of wheel B, so that a gear-wheel on its projecting end will fit into and gear with the gear on the inner side of the rim of wheel B, the position of the wheel on the end of shaft J being indicated in dotted lines, Fig. 1.

As the machine is drawn forward by the team, to be attached to a tongue rigidly connected to the front of the frame, as seen at C, wheel B is caused to revolve, and gives motion to shaft J by means of the gears arranged as aforesaid. Motion is communicated from shaft J to the cutter-bar and cutters by means of bevel-gear K on its inner end taking into a small bevel-wheel, L, on the rear end of the crank-shaft J′, which is supported in bearings, so as to turn on a line parallel to the line of motion of the machine, its front end being provided with a crank, *a*, to which the outer end of the pitman D is connected, the other end of the pitman being properly connected to the heel end of the cutter-bar H, and which in this instance is done by hooking the pitman into an eye, *b*, in the heel end of the cutter-bar H, provided with suitable cutters to work through fingers *c*, attached to finger-beam E, as the cutter-bar is reciprocated. The finger-beam E is attached to a frame, F, which is supported by means of the wheel G on shaft *d*, and by the swivel-piece *e*, which is hinged to the ears or lugs *f f* on piece M, fastened to the main frame. The inner shoe, N, or extension of part of frame F, is also connected to the main frame by means of a coupling-arm or connection, O, the outer end of which is hinged or pivoted to a hanger or bracket, *g*, attached to the front outer corner of the main frame, while the inner end is hinged between lugs or projections *h h* on the top of shoe N. It will thus be seen that the finger-beam has two supports or stays—one at or near the front outer corner of the main frame and the other on a line with the axis of the main wheels which support the main frame. The point where the coupling-arm O is hinged to the hanger *g* is on a line, or nearly so, with the crank-shaft J′, whereby the relative positions of the cutters are not materially altered or changed, as respects the fingers, by the rising and falling of the finger-beam to conform to the inequalities of the ground.

P is a sheath, which covers the space in front of wheel G, and between the brace-piece E′ and the outer piece of frame F, thus keeping cut stalks from falling in to clog and obstruct the advance of the machine, while at the same time it strengthens frame F at the point where the outer shoe, P′, is attached. The heel of the finger beam or bar F is provided with an inclined plane or wedge, *i*, directly under the heel of the cutter-bar H. (See Fig. 5.) By the use of this inclined wedge, in combination with curving up the heel of the cutter-bar, it is found that the cutter-bar works with greater ease when the cutting apparatus is rising and falling to conform to the inequalities of the ground than in the case of ordinarily-constructed finger-beams.

R is the driver's seat, supported by elliptical springs *j j*. The position of the seat is such that it fronts on a line of about forty-five degrees to the right of the line of motion of the main frame. By this position the driver can view the operation of the cutters, as well as the movements of his team, without turning too much either to the right or left. Then, again, it enables him to brace himself by his feet in such a direction and position as to prevent his being suddenly thrown upon or in front of the cutters. The springs, too, are so arranged as to resist gently any tendency to an inclination of the seat, either to the right or left of the driver, and consequently aid in the greater security of the driver while the machine is in operation.

S is the raker's stand or seat, supported by an arm, T, which projects out from the inner side of the main frame.

When the driver wishes to raise or elevate the front of frame F, or the finger-beam and cutter, he takes hold of lever *k* and depresses the end next to his seat, when the front end, which is bent and supported in bearings *k′ k′*, is revolved, and thereby the extreme front end of *k*, as seen at *t*, is raised, thereby raising the finger-beam F by means of connection *m*, one end of which is fastened to the end *t* of lever *k*, while the other end is fastened to the point of shoe N, which supports the heel of the finger-beam. Lever *k* is held in any desired position by means of pins, or a catch placed in holes in a standard, U. When the finger-beam is raised only frame F oscillates on wheel G and swivel-piece *e*.

It is often desirable to raise or fold up the finger-beam at or to the side of the main frame for storage and like purposes, in which case frame F and the finger-beam H are turned on hinge *f f* up toward the frame, as shown in black lines, Fig. 4, when the machine, including the finger-beam, occupies but little more space in width than the main frame itself.

If the machine is to be transported on its wheels from one field to another, or over cut grass, or through gates, then after the attendant has turned the machine up, as shown in black lines, Fig. 1, he takes hold of lever *k* and depresses the rear end, when the front of shoe N and the finger-beam will be elevated, as shown in red lines, same figure, when it can be fastened to lever *k* or standard U by a rope or chain, *o*, or its equivalent. When in this position the machine can be driven through gates from field to field, or over cut grass, with as much ease as a common wagon.

It will also be observed that by the combination of the lever and its connection with the finger-beam the latter can be raised and folded up by a single attendant, and that, too, without danger of injuring either the attendant or the cutters and fingers. In unfolding the same is also true, since the attendant has only to take hold of lever *k* and allow the finger-beam to descend until the shoe N rests on the ground, as seen in black lines, Fig. 4, when by taking hold of the finger-beam he is able to let it turn over gradually until it rests upon the ground, as seen in Figs. 1, 2, and 3.

When the machine is to be used as a reaper, then a platform is placed on top of frame F to receive the cut grain, and from which it is removed in gavels by the raker from his seat S. In case the grain is short, then a short platform is used, in which case the gavels are deposited on the ground through a space in front of the rear piece of frame F; but if the grain be very long, then no space or opening is left, and the gavels are deposited on the ground in rear of frame F. The raker, by pressing with his feet on the rear of frame F, can cause the same to rock back and forth on its supports, and thus raise the finger-beam and cutter to pass over cut grass or other obstructions at pleasure.

The driving-wheels of mowing and reaping machines must necessarily have considerable width of rims; and I have availed myself of this fact to use the rim of the wheel itself to support the teeth or cogs which work into the gear on the outer end of shaft J. By this means the teeth or cogs are not so liable to break, while the weight of a separate rim or back to support said teeth or cogs is rendered unnecessary, thus enabling me to use a very light, yet effective and strong driving-wheel.

Some of the parts of the machine, and the operation thereof, are more fully described in other patented divisions of even date herewith. Therefore it is useless to further describe them here.

In folding up the finger-beam to the side of the main frame the said operation may be effected with equal facility by raising first the front of the finger-beam by means of the lever *k*, and by then folding it up to the side of the main frame, in which case it will arrive directly to the position represented in red lines in Fig. 4, the attachment of the finger-beam and frame F to the main frame being such that the finger-beam can readily be folded up, whether its front be raised or lowered.

Having described one practical mode of applying my improvements to use, what I claim as my invention under this patent is—

1. The combination and relative arrangement of frames A and F with each other, and their supporting-wheels B B′ and G, substantially as and for the purposes above described.

2. Arranging or locating the shoe which supports the heel of the finger-beam in a mowing-machine, in combination with an arm or supporting-piece rigidly connected with the shoe, and which extends back of the shoe, and is connected to the frame which supports the gearing and driver by a compound or double joint, for the purposes as shown and described.

3. The combination, with the frame and shoe of a harvesting-machine connected by a supporting-piece extending from the rear of the shoe to the frame and attached thereto by a double joint, of a lateral sustaining-brace upon the opposite side from the finger-beam, so arranged as not to interfere with the free rising and falling of the entire finger-beam, nor with the folding of the same at the grass side of the machine, substantially as shown and described.

4. The inclined plane or wedge *i*, with the heel of the cutter-bar, substantially as described.

In witness whereof I have hereunto subscribed my name.

EDWIN JONES.

In presence of—
J. P. STEPHENSON,
JOEL D. JONES.